(12) United States Patent
Smith et al.

(10) Patent No.: US 6,206,960 B1
(45) Date of Patent: Mar. 27, 2001

(54) RUB RESISTANT HEATSET LITHOGRAPHIC PRINTING INK

(75) Inventors: Kenneth Smith, Hopatcong; Walter Glesias, Elmwood Park, both of NJ (US); Noritaka Hirota, Hatogaya (JP)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/338,748

(22) Filed: Jun. 23, 1999

(51) Int. Cl.$^7$ .................................................. C09D 101/00
(52) U.S. Cl. ........................ 106/500; 525/54.4; 525/423; 106/31.13; 106/31.41; 106/237
(58) Field of Search ................................. 525/54.4, 423; 106/31.13, 31.41, 237, 500

(56) References Cited

U.S. PATENT DOCUMENTS

| | | |
|---|---|---|
| 3,876,432 | 4/1975 | Carlick et al. ...................... 96/115 P |
| 4,088,618 | 5/1978 | Saltzman et al. ...................... 260/24 |
| 4,104,143 | 8/1978 | Wasilewski et al. ........... 204/159.15 |

*Primary Examiner*—Samuel A. Acquah
(74) *Attorney, Agent, or Firm*—Sidley Persley, Esq.

(57) ABSTRACT

Heatset lithographic printing ink compositions having improved rub-resistant properties containing a resin cross-linked with a polyepoxide compound and solubilized with an aliphatic alcohol.

9 Claims, No Drawings

RUB RESISTANT HEATSET LITHOGRAPHIC PRINTING INK

FIELD OF THE INVENTION

This invention relates to heatset lithographic printing ink compositions having low rub-off properties.

BACKGROUND OF THE INVENTION

Inks having low rub-off properties are known in the prior art. Such inks typically contain waxes of various types and the resultant inks will exhibit improved mar-resistance and better slip and water repellency properties. Wax of a controlled fine particle size can be mixed or ground into the batch along with pigments or may be introduced during the final blending operations. Alternatively, the wax may be compounded into a "wax media" by dispersing or melting the wax into varnishes and/or solvents and adding these to the ink.

It is generally well-known that the non-rub qualities imparted by an individual wax are a function of both the particle size and the hardness as well as the melting temperature of any particular wax. However, the addition of wax to solve the rub-off problem introduces other problems. First, on a scale of 100 which represents an ink having no rub-off, when wax is added to ink the result is a reduction in rub-off to a level of only about 60. Second, with the heat and movement imparted by the friction of constant rubbing under pressure, particles of the ink film can ball up and mark unprinted areas. Additionally, introducing more wax to improve rub resistance properties only introduces more problems with respect to gloss and hardness characteristics. The addition of wax to ink almost invariably decreases the ink's level of gloss. Accordingly, a compromise must be achieved between the desired level of non-rub properties and gloss. Finally, wax only provides minimal rub-off reduction in news ink formulations.

Synthetic waxes such as polyethylene wax and polytetrafluoroethylene wax are the most popular waxes used in the ink industry. Such waxes are usually added in the form of "non-rub" or "slip" media which are fine dispersions of the wax in the solvents, oils and resins of the particular type of ink formulation in which it is to be incorporated. Waxes prepared from polytetrafluoroethylene powders are suitable for all types of printing inks, but are especially ideal for heatset inks, where the temperature of the drying apparatus does not cause the wax to soften or melt. Polytetrafluoroethylene-based waxes can also be stirred into finished inks to improve their rub and scuff resistance. Nevertheless, the problem is not completely eliminated by these strategies, particularly with regards to transit marking rub-off of magazine covers.

Another method used in the prior art to remedy the rub-off that may occur during transit is the use of insoluble resin, or oxidative chemistry based on oxidizable resin, drying oil and metallic driers.

Heatset inks that employ commercially available lithographic solvent soluble resin chemistry have not been able to eliminate the rub off problem, particularly when they are used to print on highly oil absorbent paper. In order to solve the problem, oxidative chemistry is utilized to achieve a degree of polymerization necessary to render an ink film that will not resoften twenty four (24) to forty eight (48) hours after heatset drying due to the hydrocarbon solvents being trapped within the printed substrate.

One problem associated with inks prepared by heatset oxidative chemistry is skin formation. Skin formation occurs, for example, when the ink is placed in tote bins and pumped to the printing press. A layer or ink film will form in the tote bins or in the pumping lines that feed the press.

Another solution to solving the ink rub-off problem is to use free radical polymerized ink resins suitable for use with ultraviolet or electron beam curable inks. These inks contain no volatile solvent and achieve a high molecular weight cross-link density when cured. However, the use of curable inks is expensive and thus not widely used.

SUMMARY OF THE INVENTION

The present invention relates to heatset lithographic printing ink compositions containing a resin cross-linked with a polyepoxide compound and solubilized with an aliphatic alcohol having at least 12 carbon atoms that exhibit superior rub-off resistant properties and avoid the aforementioned problems.

DETAILED DESCRIPTION OF THE INVENTION

It has now been found that the objectives of this invention are realized by cross-linking a resin with a polyepoxide compound and solubilizing the cross-linked resins with an aliphatic alcohol having at least 12 carbon atoms.

The resin of this invention preferably comprises polyester which is reaction product of four components, namely (a) a polyol, (b) a monobasic aliphatic carboxylic acid, (c) a rosin or modified-rosin acid, and (d) a polycarboxylic acid and/or anhydride thereof.

The polyols found most suitable for producing the polyesters of the present invention are triols. Examples include but are not limited to trimethylolethane, trimethylolpropane, glycerol, and hexane triol.

The most useful monobasic aliphatic carboxylic acids are those having about 8 to 20 carbon atoms, such as for example stearic acid, lauric acid, palmitic acid, oleic acid, and refined tall oil fatty acid.

The rosin or modified rosin may be selected from tall oil rosin, wood rosin, hydrogenated rosin, dehydrogenated rosin, and the like.

The polycarboxylic acids or anhydrides (d) include phthalic anhydride, trimellitic anhydride, tetrahydrophthalic anhydride, maleic anhydride, isophthalic acid, fumaric acid, mixtures thereof and the like.

The polyesters of this invention are generally prepared by a two-step process whereby in the first step, the polyol, the monobasic aliphatic carboxylic acid, and the rosin or modified rosin are reacted at temperatures ranging from about 250° C. to 290° C., and preferably between about 260° C. and 280° C., to an acid number between about 1 to 10. In the second step, the polycarboxylic acid or anhydride is then added and the reaction is continued at temperatures ranging from about 150° C. to 220 ° C. and preferably between about 170° C. and 200° C., to an acid number between about 20 to 90, and preferably between about 20 and 50. Thus, as a result, all of the monobasic aliphatic carboxylic acid groups and most of the rosin carboxylic acid groups are reacted at about 250° C. to 290 ° C. and the aromatic carboxylic groups as pendant groups are added at about 150° C. to 210° C. Polyesters typically prepared from this synthetic route include phenolic modified rosin ester resins and maleic modified rosin ester resins.

The printing inks and overprint varnishes of the invention are prepared by grafting a polyepoxide onto carboxyl groups available on, for example, a phenolic or maleic modified rosin ester resin. The molecular weight number average for the maleic or phenolic resin is typically from about 1,500 to 3,000. The polyepoxide is preferably a diepoxide, and more preferably an aromatatic or cycloaliphatic diepoxide, and most preferably bisphenol A diepoxide. The molecular weight of the polyepoxide is up to 560 daltons, and preferably from 100 to 500 daltons, and more preferably from 300 to 500 daltons.

Grafting of the polyepoxide onto the ink resin leaves the resulting polymer oil insoluble which enhances squalene (skin oil) resistance, facilitates solvent release for improved heatset drying by comparison to prior art, and also by comparison with commercially available, rosin based resins currently used for offset printing.

Since the cross-linked resins of the invention are more insoluble, they are kept in solution in the presence of an aliphatic alcohol having at least 12 carbon atoms, and preferably 12 to 24 carbon atoms, and more preferably 12 to 13 carbons such as Neodol 23 (Shell Oil Co.). Furthermore, in order to achieve ink roller stability required for high speed, lithographic web printing, a high boiling petroleum distillate varnish solvent is preferred such as Magie 500 (Magie Bros.).

The aliphatic alcohol is used to keep the resin in solution with the hydrocarbon solvent which may be selected, for example, from Magie 500 and Magie 470 (hydrocarbon solvents available from Magie Brothers Oil Company, 9101 Fullerton Ave., Franklin Park, Ill.). Therefore, the aliphatic alcohol is used to solubilize the resin in the hydrocarbon solvent. When the balance of solubility is affected by some of the alcohol being evaporated off during the heat drying process and adsorbtion into the paper, the resin precipitates out of solution and renders an ink film that is dry to the touch. The more alcohol that evaporates off, the dryer the ink becomes. The proper amount of alcohol is that amount that would enable the ink to transfer through the printing rollers of the press and print the paper without drying during the printing process.

Additionally, the ink of the present invention will also contain a colorant. The colorant may be any of a variety of conventional organic or inorganic pigments, e.g., molybdate orange, titanium white, phthalocyanine blue, and carbon black. The amount of colorant may range from about 5 to 30 wt. % based on the total weight of the composition. Commonly known modifiers may be incorporated into the formulations using these resins, including plasticizers; wetting agents for the colorant; leveling agents, such as lanolin, paraffin waxes, and natural waxes; slip agents, such as low molecular weight polyethylenes, and microcrystalline petroleum waxes; and the like. Such modifiers are generally used in amounts ranging up to about 3 percent by weight, preferably about 1 percent, based on the total weight of the formulation. Other ingredients conventionally used in inks and coatings to modify adhesion, toughness, and other key properties can also be used.

The lithographic printing ink compositions of the present invention may be prepared in any convenient manner, such as for example in a three-roll mill, by a mix and filter process, or the like, in accordance with known dispersion techniques. Furthermore, the inks of this invention may be applied to the substrate in any known and convenient manner. The substrate on which the ink is printed is preferably paper.

The invention is illustrated by the following specific examples, but is to be understood that it is not limited to the details thereof and that changes may be made without departing from the scope of the invention. The temperatures are in degrees centigrade and the percentages are in weight percent unless otherwise indicated.

EXAMPLE 1

Varnish Preparation

A modified phenolic resin (Filtrez 694, available from AKZO NOBEL). The varnish has an acid number of 22; a softening point of 170° C., and is insoluble at a 50% concentration in Magie 47 oil and insoluble at a 33% concentration in Alkali refined linseed oil. The formulation was as follows:

| | Varnish 1 | |
|---|---|---|
| Component | wt. % | Source |
| a) Filtrez 694 | 51.28 | AKZO NOBEL |
| b) Neodol 23 | 15.29 | Shell Chemical |
| c) Magie 470 | 27.48 | Magie Bros. |
| d) Aluminum Gellant | 1.95 | Chattem Chemical |
| e) Magie 470 | 4.0 | Magie Bros. |

To prepare the varnish, components a, b, and c were heated and mixed together under nitrogen blanket to a temperature of 170° C. until all of the components formed a solution. Then, premixed components d and e were slowly added while mixing which was continued for approximately 2 hours until the proper rheology was obtained.

EXAMPLE 2

Varnish Preparation

The Filtrez 694 in Example 1 was modified with bisphenol A epoxide in order to cross-link it. The formulation was as follows:

| | Varnish 2 | |
|---|---|---|
| Component | wt. % | Source |
| a) Filtrez 694 | 50.10 | AKZO NOBEL |
| b) Magie 500 | 28.41 | Magie Bros. |
| c) EPON resin 828 | 2.43 | Shell Chemical |
| d) Benzyl Dimethylamine | 0.02 | |
| e) Neodol 23 | 19.04 | Shell Chemical |

Components a, b, c , and d were heated at a temperature of 195° C. and mixed under nitrogen blanket for approximately 4 to 6 hours in order to graft the epoxide onto the resin. After the acid number had been lowered and stable, the varnish was cooled to 170° C. to 180° C. and component e was added to achieve compatibility and the mixture was stirred for viscosity adjustment.

EXAMPLE 3

Varnish Preparation

A maleic coating applications resin (Filtrez 330, available from AKZO NOBEL) having an acid number of 30, a softening point of 140° C., an being insoluble at a 50% concentration in Magie 47 oil and partially soluble at a 33% concentration in Alkali refined linseed oil was modified with bisphenol A diepoxide in order to cross-link it. Filtrez 330 is not a lithographic resin, however, when grafted with epoxide, the acid number is lowered thereby making it suitable for lithographic applications. The formulation was as follows:

| Varnish 3 | | |
|---|---|---|
| Component | wt. % | Source |
| a) Filtrez 330 | 50.06 | AKZO NOBEL |
| b) Magie 500 | 26.81 | Magie Bros. |
| c) EPON resin 828 | 4.43 | Shell Chemical |
| d) Benzyl Dimethylamine | 0.07 | |
| e) Neodol 23 | 16.56 | Shell Chemical |
| f) Aluminum Gellant | 2.08 | Chattem Chemical |

Components a, b, c, and d were heated at a temperature of 240° C. and mixed under nitrogen for approximately 4 to 6 hours in order to graft the epoxide onto the resin. After the acid number was lowered and stable, the varnish was cooled to 170° C. to 180° C. and component e was added to achieve compatibility and the mixture was stirred for viscosity adjustment. Component f was then added and the varnish held at temperatures of 170 ° C. to 180° C. for approximately 2 additional hours in order to allow the aluminum gellant to react.

EXAMPLE 4

Ink Preparation

Cyan inks were prepared having the following formulations. The components are shown to be in wt.%.

| Component | Ink 1 | Ink 2 | Ink 3 | Ink 4 |
|---|---|---|---|---|
| Varnish 1 | 46.00 | 54.00 | — | — |
| Varnish 2 | — | — | 59.50 | — |
| Varnish 3 | — | — | — | 63.00 |
| blue pigment | 30.70 | 31.00 | 23.00 | 23.00 |
| Teflon | 07.00 | 07.00 | — | — |
| Polyethylene | — | — | 06.50 | 06.50 |
| Bodied Tung Oil | 10.00 | — | — | — |
| Co/Mn drier | 02.00 | — | — | — |
| BHT (Antioxidant) | 02.00 | — | — | — |
| Glycol (Additive) | — | — | 01.00 | 01.00 |
| Tridecyl alcohol | — | — | 10.00 | 06.50 |
| Magie 500 | — | 04.00 | — | — |
| Magie 470 | 02.30 | 04.00 | — | — |
| Total | 100 wt. % | 100 wt. % | 100 wt. % | 100 wt. % |

The components of each formulation were weighed in a mixing tub. The tub was placed under a cowles type disperser (saw tooth mixing blade) while mixing the materials at high speed until all was uniform. The mixing temperature did not exceed 140° F. The ink was adjusted for tack and viscosity. The four inks along with Versatuf Blue (a commercially available varnish from Sun Chemical, Fort Lee, N.J.) used for comparison were tested for rub-off. Versatuf has been problematic with regard to rub-off, due to ink resoftening of printed magazine covers during transit.

After application and curing, the inks are tested for abrasion resistance using the Sutherland Rub Test. This test predicts the abrasion resistance of a printed film by moving a weighted test sample over a standard receptor surface, through an arc of two and one quarter inches for a predetermined number of strokes. A supplied two-pound weight provides a contact pressure of one-half pound per square inch (psi) while a four-pound weight has a contact pressure of 1 psi. The abrasion resistance of a printed film is assessed by comparing both the intensity of ink rub-off on the surface of the receptor and the severity of marking on the printed film to that of a standard. A standard sample is included with every test run to account for variations in daily conditions and ensure reproducibility.

A Sutherland Rub Test was conducted on the 5 ink formulations described above using a four-pound weight without solvent soak and with 24 hour solvent soak. The visual results of the Sutherland Rub Test were digitized at a resolution of 300 dots per square inch (dpi) using a UMAX Gemini G16 Scanner, available from UMAX, Industrial Park, Hsinchu, Taiwan. Such digitization is represented by the equation:

$$\% \text{ show through} = (S/I+S) \times 100\%$$

wherein I represents the number of ink pixels and S represents the number of substrate pixels.

Table 1 indicates the percent show through for the rub test conducted on a paper substrate printed with various inks. The print surface and paper surface were soaked with Magie 500. 24 hours after the ink was dried, the rub tests were performed. The results show inks 3 and 4, formulated pursuant to the present invention, to have significantly less show through than the ink prepared by oxidative chemistry using a commercial resin.

TABLE 1

| | Versatuf | Ink 1 | Ink 2 | Ink 3 | Ink 4 |
|---|---|---|---|---|---|
| show through (no rubbing) | 0.1 | 0.0 | 0.0 | 0.1 | 0.0 |
| show through | 99.7 | 20.3 | 44.5 | 6.3 | 3.3 |

Table 2 indicates the show through results of the Rub Test conducted on a paper substrate printed with various inks after the reverse side of the print was soaked with Magie 500 for 24 hours, one hour after the ink was dried.

TABLE 2

| | Versatuf | Ink 1 | Ink 2 | Ink 3 | Ink 4 |
|---|---|---|---|---|---|
| show through (no rubbing) | 0.1 | 0.0 | 0.2 | 0.0 | 0.1 |
| show through | 99.9 | 0.6 | 64.4 | 2.8 | 1.2 |

The printing inks of the present invention were also tested for squalene resistance. Briefly, this test involves printing the 5 inks to a density of 2.15–2.20 on 80# Velvo paper and drying them at 300° F. After 5 hours, a drop of squalene is placed on the dried print surface in 6 different areas. The squalene is then wiped off with a Multigraphics Maxi-Wipe, (available from JM Graphics, Linden, N.J.) using a back and forth motion 5 times. The test is performed in 10 minute intervals for 60 minutes. The color density is again measured in the area where the squalene was wiped. Table 3 shows the resulting color density of the various inks after such procedure.

TABLE 3

| Interval No. | Versatuf (Control) | Ink 1 | Ink 2 | Ink 3 | Ink 4 |
|---|---|---|---|---|---|
| 1 | 0.44 | 0.88 | 1.63 | 2.15 | 2.15 |
| 2 | — | 0.86 | 1.58 | 1.99 | 2.14 |
| 3 | — | 0.80 | 1.27 | 2.05 | 2.14 |
| 4 | — | 0.57 | 0.58 | 2.08 | 2.08 |
| 5 | — | 0.58 | 0.57 | 1.58 | 2.08 |
| 6 | — | 0.58 | 0.55 | 1.58 | 2.10 |

The above data shows the epoxy graft technology to have improved color density over an ink prepared by oxidative chemistry using a commercial resin.

The invention has been described in terms of preferred embodiments thereof, but is more broadly applicable as will be understood by those skilled in the art. The scope of the invention is only limited by the following claims.

What is claimed is:

1. A heatset lithographic printing ink composition comprising a resin cross-linked with a polyepoxide compound; and an aliphatic alcohol.

2. The printing ink composition of claim 1, wherein the polyepoxide compound is a diepoxide.

3. The printing ink composition of claim 2, wherein the diepoxide is a cycloaliphatic or aromatic diepoxide.

4. The printing ink composition of claim 3, wherein the aromatic diepoxide is bisphenol A diepoxide.

5. The printing ink composition of claim 1, wherein polyepoxide has a molecular weight of up to 560 daltons.

6. The printing ink composition of claim 1, wherein the aliphatic alcohol has 12 to 24 carbon atoms.

7. The printing ink composition of claim 6, wherein the aliphatic alcohol has 12 carbon atoms.

8. The printing ink composition of claim 1, wherein the resin is selected from maleic and phenolic modified rosin esters.

9. The printing ink composition of claim 8, wherein the resin is a maleic modified rosin ester.

* * * * *